United States Patent
Maeda et al.

(12) United States Patent
(10) Patent No.: US 9,052,021 B2
(45) Date of Patent: Jun. 9, 2015

(54) VALVE, FLUIDIC APPARATUS, AND FLUID-SUPPLYING APPARATUS

(75) Inventors: Takenobu Maeda, Nagaokakyo (JP); Gaku Kamitani, Nagaokakyo (JP); Hidekazu Sasai, Nagaokakyo (JP)

(73) Assignee: Murata Manufacturing Co., Ltd, Kyoto (JP)

( * ) Notice: Subject to any disclaimer, the term of this patent is extended or adjusted under 35 U.S.C. 154(b) by 82 days.

(21) Appl. No.: 13/241,806

(22) Filed: Sep. 23, 2011

(65) Prior Publication Data

US 2012/0244454 A1 Sep. 27, 2012

Related U.S. Application Data

(63) Continuation of application No. PCT/JP2010/058797, filed on May 25, 2010.

(30) Foreign Application Priority Data

May 25, 2009 (JP) .................................. 2009-125836

(51) Int. Cl.
*G05D 16/06* (2006.01)
*F16K 7/17* (2006.01)
(Continued)

(52) U.S. Cl.
CPC .............. *F16K 7/17* (2013.01); *G05D 16/0633* (2013.01); *F16K 15/141* (2013.01); *F16K 15/144* (2013.01); *H01M 8/04082* (2013.01)

(58) Field of Classification Search
CPC .......... G05D 16/0633; G05D 16/0638; G05D 16/0644

USPC ................. 137/479, 484.2, 510, 494, 565.01, 137/484.4; 220/567.1, 567.2
See application file for complete search history.

(56) References Cited

U.S. PATENT DOCUMENTS

| | | | | |
|---|---|---|---|---|
| 2,042,274 A | * | 5/1936 | Pollock | ........................ 220/694 |
| 2,837,241 A | * | 6/1958 | Griswold | .......................... 222/52 |
| 3,075,544 A | * | 1/1963 | La Delle Heideman | ... 137/484.2 |

(Continued)

FOREIGN PATENT DOCUMENTS

EP 2 039 934 A1 3/2009
JP 60-65479 U 5/1985

(Continued)

OTHER PUBLICATIONS

Official Communication issued in International Patent Application No. PCT/JP2010/058797, mailed on Jul. 13, 2010.

*Primary Examiner* — William McCalister
(74) *Attorney, Agent, or Firm* — Keating & Bennett, LLP

(57) ABSTRACT

A valve includes a valve body, a diaphragm dividing the inside of the valve body into first and second valve chambers and being displaced under a pressure of fluid, first and second openings in communication with the first valve chamber, and a third opening in communication with the second valve chamber. When a pump is not driven, the force applied to a side of the diaphragm facing the second valve chamber is greater than the force applied to a side of the diaphragm facing the first valve chamber, and the second opening is sealed by the diaphragm. When the pump is driven and the force applied to the side of the diaphragm facing the first valve chamber becomes greater than the force applied to the side of the diaphragm facing the second valve chamber, the diaphragm allows the first and second openings and to communicate with each other.

17 Claims, 8 Drawing Sheets

(51) Int. Cl.
*F16K 15/14* (2006.01)
*H01M 8/04* (2006.01)

(56) References Cited

U.S. PATENT DOCUMENTS

| | | | |
|---|---|---|---|
| 3,388,717 A | * | 6/1968 | Kelly .......................... 137/484.2 |
| 3,994,357 A | * | 11/1976 | Smitley ........................ 180/282 |
| 5,282,546 A | * | 2/1994 | Bauer ............................ 220/565 |
| 2009/0242813 A1 | | 10/2009 | Hirata et al. |

FOREIGN PATENT DOCUMENTS

| | | |
|---|---|---|
| JP | 07-293738 A | 11/1995 |
| JP | 10-325474 A | 12/1998 |
| JP | 2003-167635 A | 6/2003 |
| JP | 2006-077823 A | 3/2006 |
| JP | 2008-218056 A | 9/2008 |
| WO | 2008/007634 A1 | 1/2008 |
| WO | 2008/081767 A1 | 7/2008 |

* cited by examiner

FIG. 11
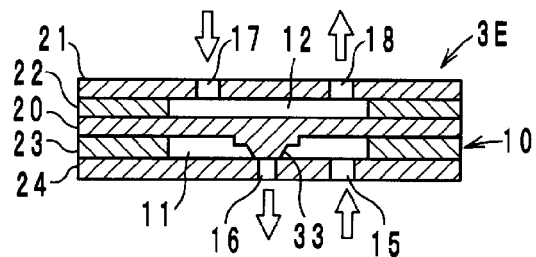
FIG. 12A
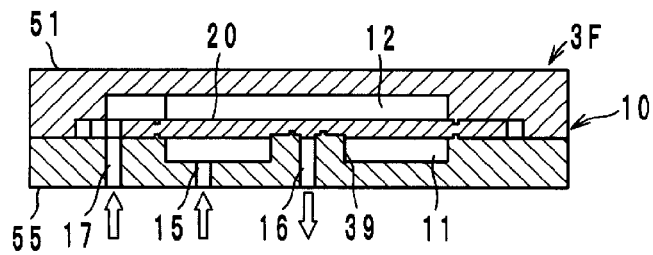
FIG. 12B
FIG. 13
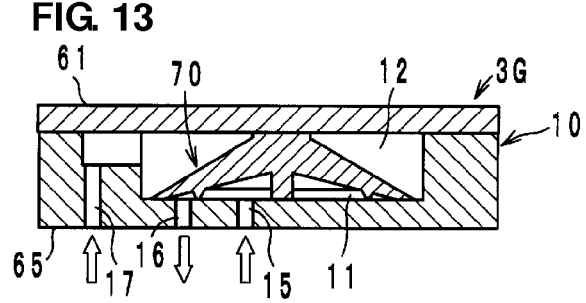

VALVE, FLUIDIC APPARATUS, AND FLUID-SUPPLYING APPARATUS

BACKGROUND OF THE INVENTION

1. Field of the Invention

The present invention relates to valves and, in particular, to a valve for regulating fluid, such as liquid fuel, and to a fluidic apparatus and a fluid-supplying apparatus each including the valve.

2. Description of the Related Art

In recent years, from the energy-saving and environmental points of view, research and development has been conducted regarding using fuel cell systems as power source units for electronic apparatuses, such as mobile phones and personal computers. In such research and development, the supply of fuel by interposing a micropump between a fuel cartridge and a power-generating cell has been studied.

International Publication No. 2008/007634 discloses a piezoelectric pump in which check valves to prevent the backward flow of fluid are provided at the inlet and the outlet, respectively. However, depending upon the circumstances under which a fuel cell system is driven, the fluid pressure of the fluid flowing from the fuel cartridge into the piezoelectric pump may become high. The piezoelectric pump provided with the check valves prevents the backward flow but cannot prevent the forward flow. Therefore, the piezoelectric pump has a problem in that, if the pressure at the inlet is high, an excessive amount of fuel may be supplied.

In this respect, a valve may be interposed between the fuel cartridge and the pump or on the downstream side of the pump. Known valves intended for such use include electromagnetic and piezoelectric valves in which the valves are driven to be opened and closed by active elements, such as an electromagnetic coil and a piezoelectric element. For example, International Publication No. 2008/081767 discloses a valve including a piezoelectric element as a drive source. However, the active element is susceptible to failure. For example, in the case of the piezoelectric valve, there is a problem in that the piezoelectric element is difficult to handle and cracks and migration may occur.

SUMMARY OF THE INVENTION

To overcome the problems described above, preferred embodiments of the present invention provide a valve, a fluidic apparatus, and a fluid-supplying apparatus in which the valve is openable and closable without using any active element and the occurrence of excessive fluid supply is prevented.

A valve according to a first preferred embodiment of the present invention preferably includes a valve body, a displacing member defining a valve chamber in combination with the valve body, a first opening provided in the valve body and connected to a side from which fluid flows in, and a second opening provided in the valve body and connected to a side from which the fluid flows out. At least one of the first opening and the second opening is closed by the displacing member. When forces applied by the fluid to front and back surfaces, respectively, of the displacing member differ from each other through the first opening, the displacing member is displaced and allows the first opening and the second opening to communicate with each other.

A valve according to a second preferred embodiment of the present invention preferably includes a valve body, a displacing member that divides the valve so as to provide a first valve chamber and a second valve chamber, a first opening that is provided in a portion of the valve body including the first valve chamber and is connected to a side from which fluid flows in, a second opening that is provided in the portion of the valve body including the first valve chamber and is connected to a side from which the fluid flows out, and a third opening that is provided in a portion of the valve body including the second valve chamber and into which differentiated fluid flows from a fluid source that is the same as that for the fluid flowing in through the first opening. At least one of the first opening and the second opening is closed by the displacing member. When a force applied by the fluid to a side of the displacing member facing the first valve chamber and a force applied by the fluid to a side of the displacing member facing the second valve chamber differ from each other through the first opening and the third opening, the displacing member is displaced and allows the first opening and the second opening to communicate with each other.

A fluidic apparatus according to a third preferred embodiment of the present invention preferably includes a valve and a differential-pressure-producing member. The valve preferably includes a valve body, a displacing member defining a valve chamber in combination with the valve body, a first opening provided in the valve body and connected to a side from which fluid flows in and to an outlet side of the differential-pressure-producing member, and a second opening provided in the valve body and connected to a side from which the fluid flows out. At least one of the first opening and the second opening is closed by the displacing member. When forces applied by the fluid to front and back surfaces, respectively, of the displacing member differ from each other through the first opening, the displacing member is displaced and allows the first opening and the second opening to communicate with each other.

A fluidic apparatus according to a fourth preferred embodiment of the present invention preferably includes a valve and a differential-pressure-producing member. The valve preferably includes a valve body, a displacing member that divides the valve body so as to provide a first valve chamber and a second valve chamber and is displaced under a pressure of fluid, a first opening that is provided in the first valve chamber and is connected to a side from which the fluid flows in and to an outlet side of the differential-pressure-producing member, the differential-pressure-producing member producing a pressure difference between the first valve chamber and the second valve chamber, a second opening that is provided in the portion of the valve body including the first valve chamber and is connected to a side from which the fluid flows out, and a third opening that is provided in a portion of the valve body including the second valve chamber and into which differentiated fluid flows from a fluid source that is the same as that for the fluid flowing in through the first opening. At least one of the first opening and the second opening is closed by the displacing member. When a force applied by the fluid to a side of the displacing member facing the first valve chamber and a force applied by the fluid to a side of the displacing member facing the second valve chamber differ from each other through the first opening and the third opening, the displacing member is displaced and allows the first opening and the second opening to communicate with each other.

A fluid-supplying apparatus according to a fifth preferred embodiment of the present invention preferably includes a fluid supply source, a valve, and a differential-pressure-producing member. The valve preferably includes a valve body, a displacing member that divides the valve body so as to provide a first valve chamber and a second valve chamber and is displaced under a pressure of fluid, a first opening that is provided in a portion of the valve body including the first valve chamber and is connected to a side from which the fluid flows in and to an outlet side of the differential-pressure-producing member, the differential-pressure-producing member producing a pressure difference between the first valve chamber and the second valve chamber, a second opening that is provided in the portion of the valve body including the first valve chamber and is connected to a side from which the fluid flows out, and a third opening that is provided in a portion of the valve body including the second valve chamber and into which differentiated fluid flows from a fluid source that is the same as that for the fluid flowing in through the first opening. At least one of the first opening and the second opening is closed by the displacing member. When a force applied by the fluid to a side of the displacing member facing the first valve chamber and a force applied by the fluid to a side of the displacing member facing the second valve chamber differ from each other through the first opening and the third opening, the displacing member is displaced and allows the first opening and the second opening to communicate with each other.

Each of the above valves preferably includes the displacing member that is displaced when the pressure of the fluid flowing into the valve chamber is changed and the forces applied to the front and back surfaces thereof change. Therefore, the valve is openable and closable without any special active element, such as an electromagnetic element, a piezoelectric element, or any other type of active element. Moreover, when not driven, at least one of the first opening and the second opening is closed by the displacing member. Furthermore, when the forces applied by the fluid to the front and back surfaces of the displacing member (the force applied to the side facing the first valve chamber and the force applied to the side facing the second valve chamber) differ from each other by the differential-pressure-producing member or other suitable member, the first opening and the second opening communicate with each other. Therefore, when not driven, even if the fluid pressure at the first opening increases, the fluid does not leak from the second opening and is prevented from being excessively supplied. In addition, since the pressure of the fluid is the drive source, neither an electromagnetic coil nor a piezoelectric element is required and a failure that may occur in drive sources of these types does not occur, such that excellent reliability is provided.

According to various preferred embodiments of the present invention, the valve is openable and closable without using any active element, and the occurrence of excessive supply is effectively prevented.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 11 is a sectional view of a passive valve according to a fifth preferred embodiment of the present invention.

FIGS. 12A and 12B illustrate a passive valve according to a sixth preferred embodiment of the present invention, wherein FIG. 12A is a sectional view in an assembled state and FIG. 12B is a sectional view in a disassembled state.

FIG. 13 is a sectional view of a passive valve according to a seventh preferred embodiment.

DETAILED DESCRIPTION OF THE PREFERRED EMBODIMENTS

Figure 1:
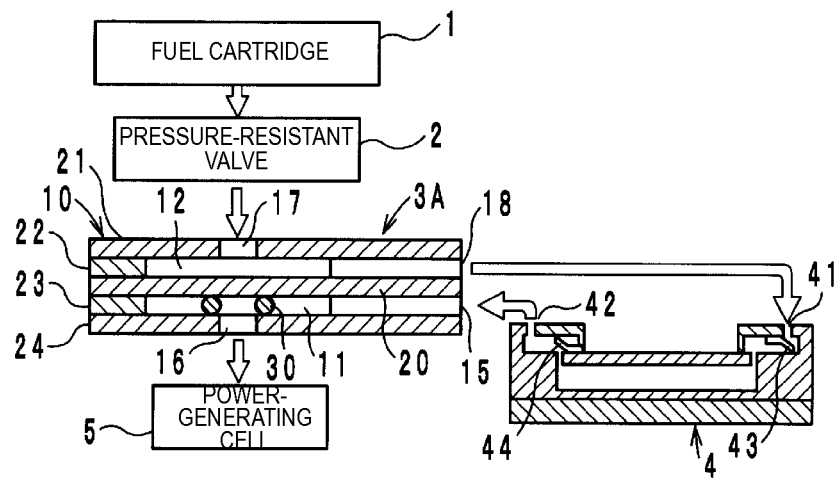
FIG. 1 is a schematic diagram of a fluid-supplying apparatus including a passive valve according to a first preferred embodiment of the present invention.

Preferred embodiments of the valve, fluidic apparatus, and fluid-supplying apparatus according to the present invention will now be described with reference to the accompanying drawings. Members and portions that are common to the drawings are denoted by the same reference numerals and redundant descriptions thereof are omitted.

First Preferred Embodiment

Referring to FIG. 1, a fluid-supplying apparatus including a passive valve 3A according to a first preferred embodiment preferably includes a fuel cartridge 1, a pressure-resistant valve 2, the passive valve 3A, and a pump 4 as differential-pressure-producing member. Fuel (for example, methanol) stored in the fuel cartridge 1 is supplied from the passive valve 3A to a power-generating cell 5 through the pressure-resistant valve 2 and the pump 4.

The passive valve 3A preferably includes a valve body 10, a diaphragm 20 that divides the inside of the valve body 10 into a first valve chamber 11 and a second valve chamber 12, an inlet-side opening (third opening) 17 and a pump-inlet-side opening 18 in fluid communication with the second valve chamber 12, and a pump-outlet-side/valve-inlet-side opening (first opening) 15 and an output-side opening (second opening) 16 in fluid communication with the first valve chamber 11. The inlet-side opening 17 is connected to the fuel cartridge 1 through the pressure-resistant valve 2. The pump-inlet-side opening 18 is connected to an inlet 41 of the pump 4. The pump-outlet-side/valve-inlet-side opening 15 is connected to an outlet 42 of the pump 4. The output-side opening 16 is connected to the power-generating cell 5.

The pump 4 is preferably a commonly known product including check valves 43 and 44 at the inlet 41 and the outlet 42, respectively, for example. The fuel cartridge 1, the pressure-resistant valve 2, and the power-generating cell 5 are also preferably commonly known products, for example, and detailed descriptions thereof are omitted. The pressure-resistant valve 2 may not necessarily be provided.

Figure 2:
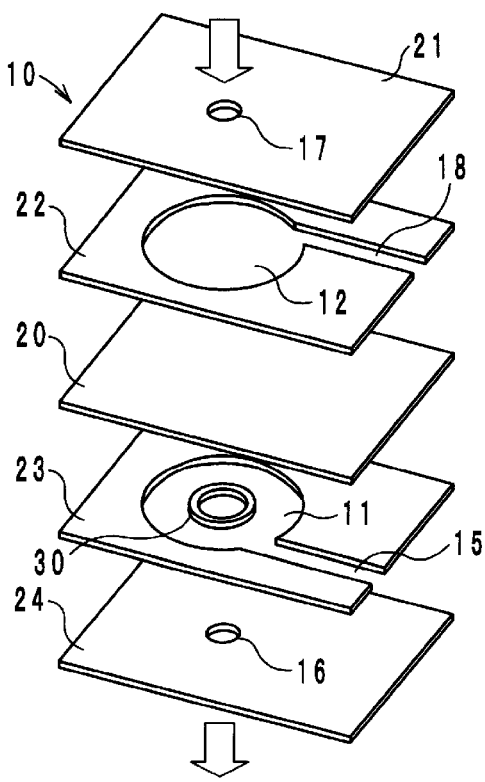
FIG. 2 is an exploded perspective view of the passive valve illustrated in FIG. 1.

Referring to FIG. 2, the valve body 10 is defined by a stack preferably including a top plate 21 including the opening 17, a plate member 22 including the second valve chamber 12 and the opening 18, the diaphragm 20, a plate member 23 including the first valve chamber 11 and the opening 15, and a bottom plate 24 including the opening 16. A seal member (O-ring) 30 is preferably provided in the first valve chamber 11 and is bonded to the bottom plate 24.

Figure 3A:
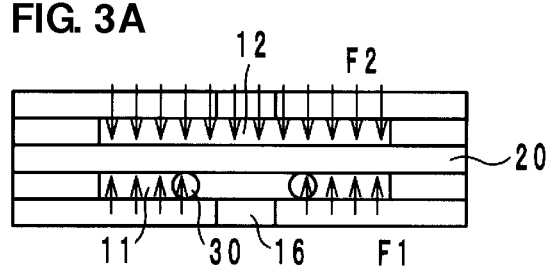
FIGS. 3A and 3B are diagrams illustrating the principle of operation of the passive valve illustrated in FIG. 1.
Figure 3B:
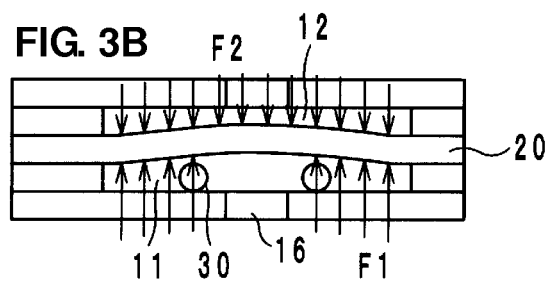

The principle of operation of the passive valve 3A will be described with reference to FIGS. 3A and 3B. The force applied to the upper side of the diaphragm 20 by the fluid in the second valve chamber 12 is denoted by F2. The force applied to the lower side of the diaphragm 20 by the fluid in the first valve chamber 11 is denoted by F1. Forces F1 and F2 are each expressed as pressure-receiving area×fluid pressure. In the first valve chamber 11, the area of the seal member 30 is subtracted from the pressure-receiving area on the lower side of the diaphragm 20. That is, the pressure-receiving area on the side of the second valve chamber 12 is greater than the pressure-receiving area on the side of the first valve chamber 11. If force F2 is greater than force F1 (see FIG. 3A), the diaphragm 20 presses the seal member 30. Therefore, the opening is closed to the first valve chamber 11. In contrast, if force F1 is greater than force F2 (see FIG. 3B), the diaphragm 20 is lifted up and the opening 16 is open to the first valve chamber 11.

Figure 4:
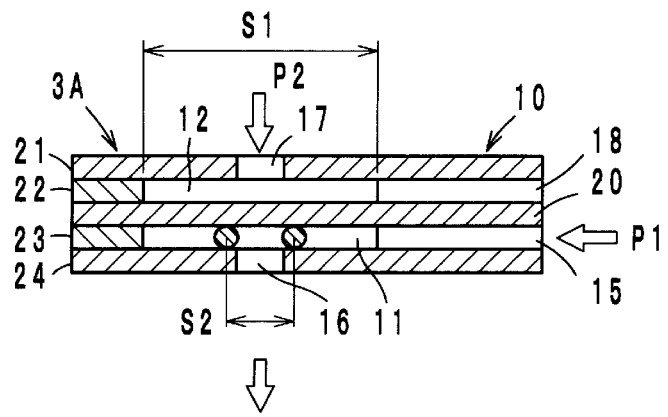
FIG. 4 is a diagram illustrating the operation of the passive valve illustrated in FIG. 1.

Referring to FIG. 4, the force relationship described above will be described more specifically, considering the relationship between the fluid pressures of the fuel cartridge 1 and the pump 4. Denoting the pressure of the fluid flowing from the fuel cartridge 1 into the second valve chamber 12 as P2, the pressure of the fluid flowing from the pump 4 into the first valve chamber 11 as P1, the pressure-receiving area of the diaphragm 20 on the side of the valve chamber 12 as S1, and the area of the seal member 30 as S2, forces F2 and F1 applied to the upper and lower sides, respectively, of the diaphragm 20 are each expressed as pressure-receiving area×fluid pressure. Thus, preferably, the following relationship is established: the force F2 applied to the upper side of the diaphragm 20 by the fluid in the second valve chamber 12 is expressed as area S1×pressure P2, and the force F1 applied to the lower side of the diaphragm 20 by the fluid in the first valve chamber 11 is expressed as (area S1−S2)×pressure P1.

The fuel flows from the fuel cartridge 1 into the second valve chamber 12 and further into the inlet 41 of the pump 4. When the pump 4 is not driven, the pressure P1 of the fluid flowing from the pump 4 is less than the pressure P2 of the fluid flowing from the fuel cartridge 1 by an amount corresponding to the pressure loss caused by the pump 4, that is, pressure P2>pressure P1. Thus, a relationship of force F2>force F1 is maintained between the forces applied to the upper and lower sides of the diaphragm 20. Therefore, the opening 16 is closed, which prevents the fuel from being supplied from the opening 16. When the pump 4 is driven and the fuel is supplied from the opening 15 into the first valve chamber 11, the pressure P1 gradually increases and a relationship of force F2<force F1 is established. Accordingly, the diaphragm 20 is displaced and the opening 16 is opened, whereby the fuel is supplied from the opening 16 to the power-generating cell 5.

Differential pressure ΔP of the fluid produced by driving the pump 4 is defined as pressure P1−pressure P2. Even if the differential pressure ΔP is zero, the pressure-receiving area for the force F1 is small by an area approximately equal to S2, and the relationship of force F2>force F1 is maintained.

Therefore, the opening 16 is closed. This shows that the valve is highly reliable.

When the pressure in the fuel cartridge 1 increases because of a rise in the ambient temperature or other external factors, the fuel flows into the second valve chamber 12 and further into the pump 4. The pump 4 includes the check valves 43 and 44 but cannot stop the forward flow. In such a case, in the passive valve 3A, even if the pressure P2 in the second valve chamber 12 increases, the pressure P2 simply acts as a pressure that presses the diaphragm 20 against the seal member 30, with the relationship of force F2>force F1 maintained. Therefore, the opening 16 is maintained closed, which prevents the occurrence of excessive supply.

Thus, a highly reliable valve is obtained even without using any active element. Furthermore, since a drive circuit, electrical power, and other components required for a valve including an active element are not necessary, the overall system saves energy and the size thereof are reduced.

Furthermore, although the differential-pressure-producing member according to the first preferred embodiment is preferably a pump, the differential-pressure-producing member according to other preferred embodiments of the present invention only needs to be an element that produces a pressure difference between the first valve chamber and the second valve chamber, i.e., a difference between pressures applied to the front and back surfaces of the displacing member (diaphragm), and is not limited to the pump.

If a pump is used as the differential-pressure-producing member, the opening 16 can be easily opened and closed by driving the pump and, thus, adjusting the pressures P1 and P2, to thereby provide excellent responsiveness in the opening and closing of the opening 16. Furthermore, such a configuration is applicable to, for example, flammable fluid and other types of fluids and has no limitations on fluid properties, which provide excellent versatility. Furthermore, in the case in which the differential-pressure-producing member provided to the valve is a pump, a fluidic apparatus capable of ejecting a constant amount of fluid may preferably be provided. For example, if the fuel cartridge is positioned at substantially the same level as the pump and the valve or at a level significantly higher than the pump and the valve, an additional pressure can be applied to the second valve chamber of the valve. This reduces the variations in the fluid pressure at the outlet-side opening of the valve. Accordingly, even if there are any changes in the pressure at the outlet and inlet sides of the pump because of any changes in the ambient environment, variations in the flow rate are prevented and a constant amount of fluid can be ejected.

The second valve chamber 12 may not necessarily be provided in the form of a chamber. The opening 18 illustrated in FIG. 2 may preferably be widened so as to have a width the same or substantially the same as the diameter of the second valve chamber 12. However, in that case, the above-described relationships between the pressures P1 and P2 and between the forces F1 and F2 must be maintained.

Second Preferred Embodiment

Figure 5:
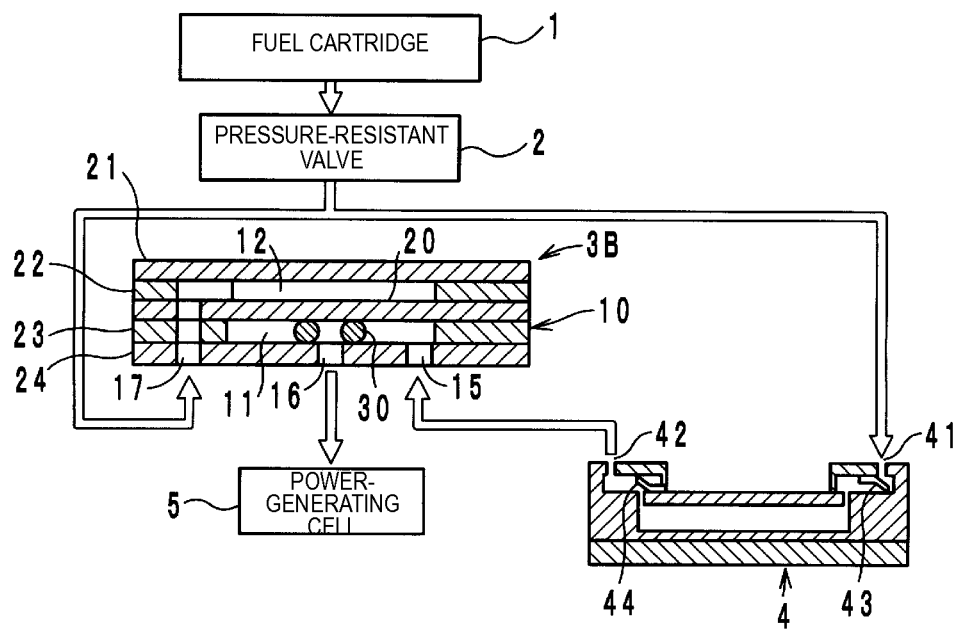
FIG. 5 is a schematic diagram of a fluid-supplying apparatus including a passive valve according to a second preferred embodiment of the present invention.

A fluid-supplying apparatus including a passive valve 3B according to a second preferred embodiment of the present invention is illustrated in FIG. 5 and has substantially the same configuration as that of the first preferred embodiment, except that the comparative inlet-side opening 17 connected to the fuel cartridge 1 through the pressure-resistant valve 2 and communicating with the second valve chamber 12 is preferably provided on the lower side of the valve body 10, and that the fuel from the fuel cartridge 1 is preferably directly connected to the inlet 41 of the pump 4 through the pressure-resistant valve 2. The opening 17 preferably extends from the bottom plate 24 through the diaphragm 20 and communicates with the second valve chamber 12. The pump-outlet-side/valve-inlet-side opening 15 through which the outlet 42 of the pump 4 and the first valve chamber 11 communicate with each other is provided on the lower side of the valve body 10.

The principle of operation of the passive valve 3B according to the second preferred embodiment is the same or substantially the same as that in the first preferred embodiment. That is, the fuel flows from the fuel cartridge 1 through the opening 17 into the second valve chamber 12 and further into the inlet 41 of the pump 4. When the pump 4 is not driven, pressure P2>pressure P1. Thus, force F2>force F1, and the opening 16 is therefore closed so as to prevent the fuel from being supplied from the opening 16. When the pump 4 is driven and the fuel is supplied from the opening 15 into the first valve chamber 11, the pressure P1 increases and a relationship of force F2<force F1 is established. This causes the diaphragm 20 to be displaced, and the opening 16 is opened. Thus, the fuel is supplied from the opening 16 to the power-generating cell 5.

If the pressure in the fuel cartridge 1 increases because of a rise in the ambient temperature or other external factors, the fuel flows into the second valve chamber 12 and into the pump 4. The pump 4 preferably includes the check valves 43 and 44 but cannot stop the forward flow. In such a case, in the passive valve 3B, even if the pressure P2 in the second valve chamber 12 increases, the pressure P2 simply acts as a pressure that presses the diaphragm 20 against the seal member 30, and the relationship of force F2>force F1 is maintained. Therefore, the opening 16 is maintained closed, which prevents the occurrence of excessive supply.

Figure 6:
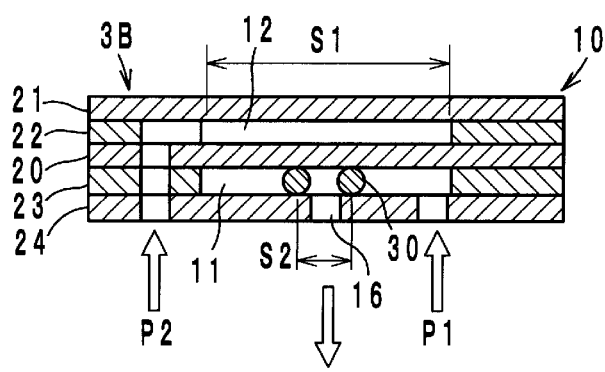
FIG. 6 is a diagram illustrating the operation of the passive valve illustrated in FIG. 5.

Here, the relationship between the pressure P2 on the fuel-cartridge side and the pressure P1 on the pump side in the passive valve 3B according to the second preferred embodiment will be described with reference to FIG. 6. Exemplary materials and thicknesses of the individual members included in the valve body 10 are described below, which enable the passive valve to be thin and compact. The top plate 21 and the bottom plate 24 are preferably made of acrylic resin and each have a thickness of about 3 mm, for example. The plate members 22 and 23 are preferably made of glass epoxy resin and each have a thickness of about 1.6 mm, for example. The diaphragm 20 is preferably made of PET resin and has a thickness of about 0.1 mm, for example. The seal member 30 is preferably made of NBR, for example. The valve body 10 preferably has a thickness of about 9.3 mm and a plan-view size of about 50 mm×about 50 mm, for example.

Measurements of the pressures P1 and P2 were taken at the time of opening of the passive valve 3B with the diameter of the diaphragm 20 preferably being about 30 mm, the diameter of the seal member 30 being about 5.0 mm, the heights of the first valve chamber 11 and the second valve chamber 12 each being about 1.6 mm, for example, and the pump 4 preferably being driven at about 1 Hz and at about 6 Vpp, for example. The results showed that the relationship of force F2<force F1 was satisfied with the pressure P1 on the side of the pump 4 being about 6.0 kPa and the pressure P2 on the side of the fuel cartridge 1 being about 5.0 kPa.

Figure 7A:
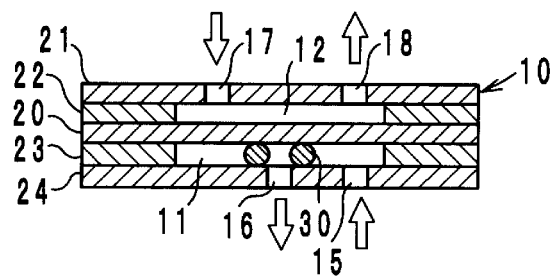
FIGS. 7A to 7C are sectional views illustrating modifications of the passive valve.
Figure 7B:
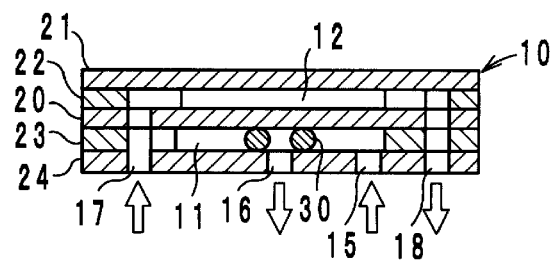
Figure 7C:
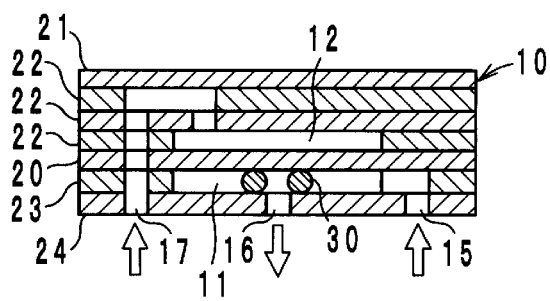

Modifications of the passive valves 3A and 3B according to preferred embodiments of the present invention will now be described with reference to FIGS. 7A to 7C. FIG. 7A illustrates a first modification, which is a modification of the first preferred embodiment. In the first modification, the pump-inlet-side opening 18 is preferably provided in the top plate 21, and the pump-outlet-side/valve-inlet-side opening 15 is provided in the bottom plate 24. FIG. 7B illustrates a second modification, which is a modification of the second preferred embodiment. In the second modification, the pump-inlet-side opening 18 and the pump-outlet-side/valve-inlet-side opening 15 are preferably provided in the bottom plate 24. FIG. 7C illustrates a third modification, which is another modification of the second preferred embodiment. In the third modification, three plate members 22 are preferably provided, and the fuel introduced from the inlet-side opening 17 is supplied to the second valve chamber 12 from directly above. Furthermore, the pump-outlet-side/valve-inlet-side opening 15 is preferably provided at a slightly outer location.

Third Preferred Embodiment

Figure 8:
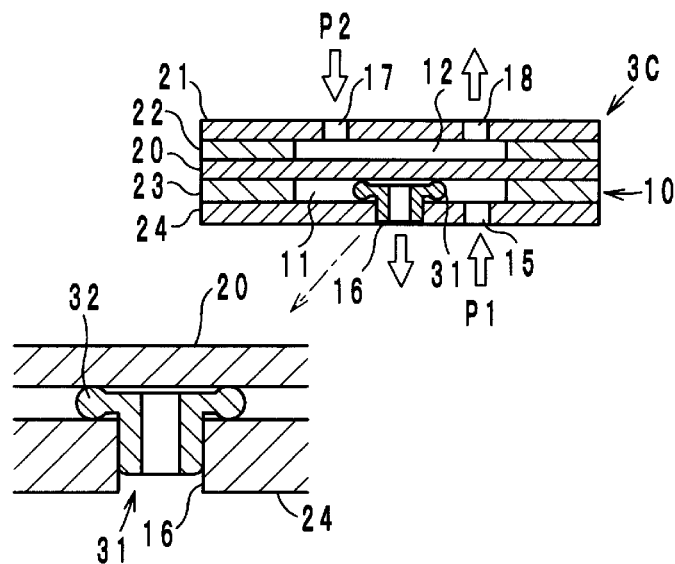
FIG. 8 is a sectional view of a passive valve according to a third preferred embodiment of the present invention and an enlarged view illustrating a portion of the passive valve.

FIG. 8 illustrates a passive valve 3C according to a third preferred embodiment of the present invention. The passive valve 3C preferably has a reduced thickness and size and includes the top plate 21, the plate members 22 and 23, the diaphragm 20, and the bottom plate 24 that are all preferably made of PET resin, for example, and also includes a seal member 31 that is preferably made of silicon rubber, for example. The seal member 31, as illustrated in enlarged view in FIG. 8, is a cylindrical body including a flange portion 32 extending outward and is fitted in the opening 16 so as to be movable toward and away from opening 16.

The principle of operation of the passive valve 3C according to the third preferred embodiment is the same or substantially the same as that in the first preferred embodiment. That is, the fuel flows from the fuel cartridge 1 through the opening 17 into the second valve chamber 12 and further into the inlet 41 of the pump 4. When the pump 4 is not driven, pressure P2>pressure P1. Thus, the relationship of force F2>force F1 is satisfied. In this state, since the flange portion 32 of the seal member 31 is in contact with the diaphragm 20, the opening 16 is closed so as prevent the fuel from being supplied from the opening 16. When the pump 4 is driven and the fuel is supplied from the opening 15 into the first valve chamber 11, the pressure P1 increases and a relationship of force F2<force F1 is established. This causes the diaphragm 20 to be displaced toward the side from which the fuel flows in, producing a gap between the flange portion 32 and the diaphragm 20. Thus, the opening 16 is opened and the fuel is supplied from the opening 16 to the power-generating cell 5.

If the seal member 31 is provided as in the third preferred embodiment, the seal member does not need to be fixed with adhesive or other fixing material, unlike in the first preferred embodiment. Therefore, improved reliability is provided, free of problems such as the seal member being detached.

Fourth Preferred Embodiment

Figure 9:
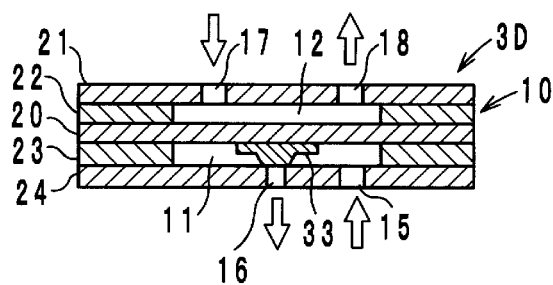
FIG. 9 is a sectional view of a passive valve according to a fourth preferred embodiment of the present invention.
Figure 10:
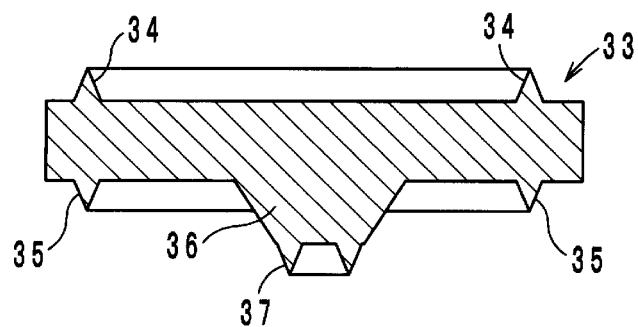
FIG. 10 is a sectional view illustrating a diaphragm included in the passive valve illustrated in FIG. 9.

FIG. 9 illustrates a passive valve 3D according to a fourth preferred embodiment of the present invention. The passive valve 3D preferably includes a seal member 33 illustrated in FIG. 10 which replaces the seal member 31 included in the passive valve 3C according to the third preferred embodiment. Preferably, the seal member 33 is made of silicon rubber, for example, and includes ring-shaped projections 34 and 35 provided on the upper and lower sides, respectively, thereof. The projections 34 and 35 each preferably have a triangular shape in sectional view. The seal member 33 also preferably includes a projection 36 on the lower side thereof. The projection 36 preferably includes a ring-shaped projection 37 having a triangular shape in sectional view. The projections 34, 35, and 37 are pressed against the diaphragm 20 and the bottom plate 24, whereby fuel leakage can be more securely prevented.

Fifth Preferred Embodiment

FIG. 11 illustrates a passive valve 3E according to a fifth preferred embodiment of the present invention. The passive valve 3E preferably includes the seal member 33, included in the passive valve 3D according to the fourth preferred embodiment, provided integrally with the diaphragm 20 and preferably made of silicon rubber, for example. Thus, the seal member 30 does not need to be fixed with adhesive or other fixing material, unlike in the first preferred embodiment. Therefore, improved reliability is provided, free of problems such as the seal member being detached.

Sixth Preferred Embodiment

FIGS. 12A and 12B illustrate a passive valve 3F according to a sixth preferred embodiment of the present invention. The passive valve 3F preferably includes the valve body 10 defined by resin molds, for example. The valve body 10 preferably includes an upper body 51 and a lower body 55. The diaphragm 20 is sandwiched between the upper body 51 and the lower body 55. The second valve chamber 12 is provided in the upper body 51, and the first valve chamber 11 is provided in the lower body 55. The lower body 55 also preferably includes a seal member 39 provided integrally therewith.

The diaphragm 20 is preferably made of a soft material and is pinched between microscopic projections 52 and 56 provided on the upper body 51 and the lower body 55, respectively, and with a microscopic projection 39a provided on the seal member 39 such that the diaphragm 20 does not shift out of position.

Seventh Preferred Embodiment

FIG. 13 illustrates a passive valve 3G according to a seventh preferred embodiment of the present invention. As in the sixth preferred embodiment, the passive valve 3G preferably includes the valve body 10 defined by resin molds (including an upper body 61 and a lower body 65). The passive valve 3G also includes preferably a displacing member 70 having a substantially umbrella-like shape and made of, for example, silicon rubber. The displacing member 70 also functions as a seal member.

Figure 14:
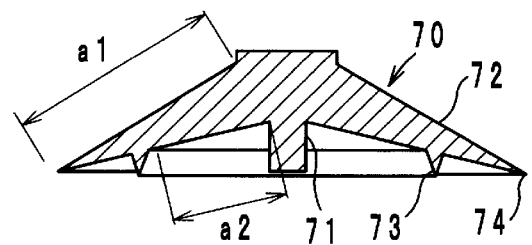
FIG. 14 is a sectional view of a displacing member included in the passive valve illustrated in FIG. 13.

Referring to FIG. 14, the displacing member 70 preferably includes a support portion 71 and an umbrella-shaped flexible portion 72 sloping with respect to the axis of the support portion 71. The umbrella-shaped flexible portion 72 includes a ring-shaped projection 73 having a triangular shape in sectional view. The output-side opening 16 is arranged between a tip 74 and the projection 73. The pump-outlet-side/valve-inlet-side opening 15 is positioned between the projection 73 and the support portion 71. The umbrella-shaped flexible portion 72 functions as an on-off valve. Pressure P2 on the side of the fuel cartridge 1 is applied to a portion of the umbrella-shaped flexible portion 72 defined by length a1 and presses the umbrella-shaped flexible portion 72 downward. Pressure P1 on the side of the pump 4 is applied to a portion of the umbrella-shaped flexible portion 72 defined by length a2 (a1>a2) and extending from the support portion 71 to the projection 73 and presses the umbrella-shaped flexible portion 72 upward.

When the pump 4 is not driven, pressure P2>pressure P1 and force F2>force F1. Therefore, the opening 16 is closed so as to prevent the fuel from being supplied from the opening 16. When the pump 4 is driven and the fuel is supplied from the opening 15 into the first valve chamber 11, the pressure P1 increases. When a relationship of force F2<force F1 is established, the projection 73 moves away from the bottom surface of the first valve chamber 11, and the opening 16 is opened, whereby the fuel is supplied from the opening 16 to the power-generating cell 5. Even if the pressure in the fuel cartridge 1 increases because of a rise in the ambient temperature or other external factors and the pressure P2 in the second valve chamber 12 increases, the relationship of force F2>force F1 is maintained. Therefore, the opening 16 is maintained closed, which prevents the occurrence of excessive supply.

Figure 15A:
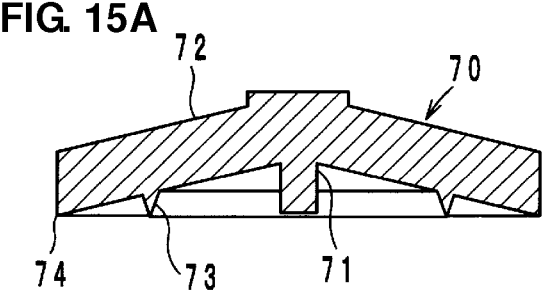
FIGS. 15A and 15B include sectional views illustrating modifications of the displacing member illustrated in FIG. 14.
Figure 15B:
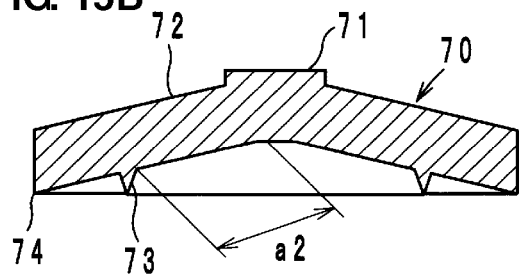
Figure 16:
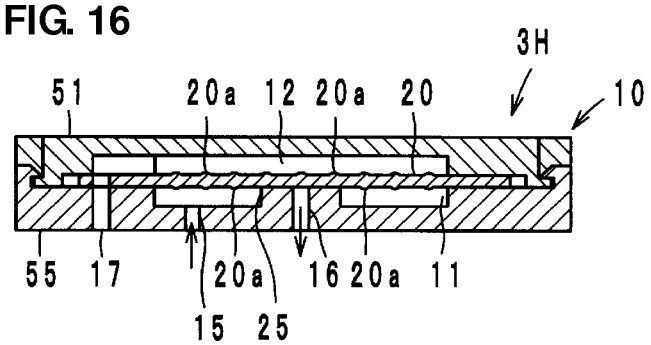
FIG. 16 is a sectional view of a passive valve according to an eighth preferred embodiment of the present invention.
Figure 17:
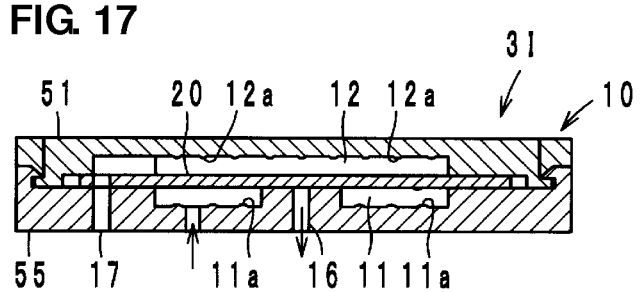
FIG. 17 is a sectional view of a passive valve according to a ninth preferred embodiment of the present invention.

The displacing member 70 may be replaced with a modification illustrated in FIGS. 15A and 15B. FIG. 15A illustrates a first modification in which the umbrella-shaped flexible portion 72 has a uniform thickness from the base to the tip thereof. Thus, the withstand pressure can be set to a relatively large value, and the design to establish the balance between the forces F1 and F2 can be made easily. FIG. 15B illustrates a second modification in which a lower portion of the support portion 71 is omitted. In this case, the length a2 defining the portion receiving the force F1 is increased, while the relationship of a1>a2 is maintained, and the opening 16 can be opened with a smaller differential force.

Eighth and Ninth Preferred Embodiments

It is preferable that, when in operation, the diaphragm 20 be prevented from adhering to surfaces defining the valve-portion chambers 11 and 12 that face the diaphragm 20. Therefore, in a passive valve 3H according to an eighth preferred embodiment of the present invention, microscopic irregularities 20a are preferably provided on the upper and lower surfaces of the diaphragm 20 excluding a portion at which the second opening 16 is closed. In addition, in place of the seal member 30, a seat portion 25 is preferably provided around the second opening 16.

In a passive valve 3I according to a ninth preferred embodiment of the present invention, inner surfaces defining the respective first and second valve chambers 11 and 12 and facing the respective upper and lower surfaces of the diaphragm 20 each preferably include microscopic irregularities 11a or 12a.

In the eighth and ninth preferred embodiments, the valve body 10 includes the bodies 51 and 55 described in the sixth preferred embodiment (see FIG. 12).

The valve, fluidic apparatus, and fluid-supplying apparatus according to the present invention are not limited to those of the preferred embodiments described above and may be modified in various ways within the scope thereof.

Particularly, the first valve chamber and the second valve chamber provided in the valve body may not necessarily be provided independently when the differential-pressure-producing member is not driven. For example, in a preferred embodiment of the present invention in which the displacing member directly closes the second opening, the first valve chamber may be configured to appear when the differential-pressure-producing member is driven and the displacing member is displaced. In another preferred embodiment of the present invention in which the displacing member directly closes the third opening provided in the top plate, the second valve chamber may be configured to appear when the differential-pressure-producing member is driven and the displacing member is displaced.

If the pressure is applied to the upper surface of the diaphragm synchronously with the pressure of the fluid flowing from the fuel cartridge, the first opening may be directly connected to the side from which the fluid flows in, for example, the outlet of the pump, without providing the second valve chamber and the third opening. When the pump is not driven, the second opening connected to the side from which the fluid flows out, for example, the power-generating cell, is closed by the diaphragm. In such a case, when the pump is not driven, the force applied to the diaphragm from the outer side of the valve chamber, which is essentially the pressure applied synchronously with the fluid pressure from the fuel cartridge×the area of the valve chamber, is greater than the force applied from the inner side of the valve chamber. Therefore, the second opening is closed by the diaphragm. When the pump is driven, if the force applied to the diaphragm from the inner side of the valve chamber becomes greater than the force applied to the diaphragm from the outer side of the valve chamber, the diaphragm allows the first opening and the second opening to communicate with each other.

Accordingly, the valve may preferably include a valve body, a displacing member providing a valve chamber in combination with the valve body, a first opening provided in the valve body and connected to a side from which fluid flows in, and a second opening provided in the valve body and connected to a side from which the fluid flows out. The valve may preferably be controlled such that at least one of the first opening and the second opening is closed by the displacing member, and such that, when forces applied by the fluid to front and back surfaces, respectively, of the displacing member differ from each other through the first opening, the displacing member is displaced and allows the first opening and the second opening to communicate with each other.

Furthermore, the fluid is not limited to liquid fuel to be supplied to the power-generating cell and may be gas, for example, as mentioned in the preferred embodiments described above.

As described above, preferred embodiments of the present invention are applicable to valves, fluidic apparatuses, and fluid-supplying apparatuses and are particularly superior in that the valve is openable and closable without using any active element and that the occurrence of excessive supply is prevented.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A fluidic apparatus comprising:
a differential-pressure-producing member;
a valve body defined by a stack including a bottom plate, a plate member including a first valve chamber, a diaphragm, a plate member including a second valve chamber, and a top plate;
a first opening provided in the valve body at a location of the valve body from which fluid flows in;
a second opening provided in the valve body at a location of the valve body from which the fluid flows out; and
a third opening provided in the valve body and into which differentiated fluid flows from a fluid source that is the same as that for the fluid flowing in through the first opening; wherein
at least one of the first opening and the second opening is closed by the diaphragm;
when a force applied by the fluid through the first opening to a front surface of the diaphragm differs from a force applied by the fluid through the third opening to a back surface of the diaphragm, the diaphragm is displaced and allows the first opening and the second opening to communicate with each other;
the differential-pressure-producing member is defined by a pump including an inlet and an outlet; and
the first opening is connected to the outlet of the pump and the third opening is connected to the inlet of the pump.

2. The fluidic apparatus according to claim 1, wherein at least one of the first opening and the second opening is provided with a seal member, and the seal member and the diaphragm are in contact with each other when the differential-pressure-producing member is not driven.

3. The fluidic apparatus according to claim 2, wherein the seal member has a ring-shaped configuration and is in line contact with the diaphragm.

4. The fluidic apparatus according to claim 2, wherein the seal member and the diaphragm are provided as an integral body.

5. The fluidic apparatus according to claim 1, wherein
the diaphragm includes a support portion and an umbrella-shaped flexible portion sloping with respect to an axis of the support portion, the umbrella-shaped flexible portion including a projection on a surface thereof facing the first and second openings; and
the second opening is covered by the projection of the umbrella-shaped flexible portion when the differential-pressure-producing member is not driven.

6. The fluidic apparatus according to claim 1, wherein the diaphragm is a diaphragm, and irregularities are provided in surfaces of the diaphragm excluding a seal portion and/or inner surfaces defining the first and second valve chambers, respectively, and facing the diaphragm.

7. A fluidic apparatus comprising:
a differential-pressure-producing member;
a valve body defined by a stack including a bottom plate, a plate member including a first valve chamber, a diaphragm, a plate member including a second valve chamber, and a top plate;
a first opening provided in a portion of the valve body including the first valve chamber and at a location of the valve body from which fluid flows in;
a second opening provided in the portion of the valve body including the first valve chamber and at a location of the valve body from which the fluid flows out; and
a third opening provided in a portion of the valve body including the second valve chamber and into which differentiated fluid flows from a fluid source that is the same as that for the fluid flowing in through the first opening; wherein
at least one of the first opening and the second opening is closed by the diaphragm;
when a force applied by the fluid through the first opening to a side of the diaphragm facing the first valve chamber and a force applied by the fluid through the third opening to a side of the diaphragm facing the second valve chamber differ from each other, the diaphragm is displaced and allows the first opening and the second opening to communicate with each other; wherein
the differential-pressure-producing member is defined by a pump including an inlet and an outlet; and
the first opening is connected to the outlet of the pump and the third opening is connected to the inlet of the pump.

8. The fluidic apparatus according to claim 7, wherein an area of a portion of the diaphragm that is in contact with the fluid in the second valve chamber is greater than an area of a portion of the diaphragm that is in contact with the fluid in the first valve chamber.

9. The fluidic apparatus according to claim 7, wherein at least one of the first opening and the second opening is provided with a seal member, and the seal member and the diaphragm are in contact with each other when the differential-pressure-producing member is not driven.

10. The fluidic apparatus according to claim 9, wherein the seal member has a ring-like shape and is in line contact with the diaphragm.

11. The fluidic apparatus according to claim 9, wherein the seal member and the diaphragm are provided as an integral body.

12. The fluidic apparatus according to claim 7, wherein the diaphragm includes a support portion and an umbrella-shaped flexible portion sloping with respect to an axis of the support portion, the umbrella-shaped flexible portion including a projection on a surface thereof facing the first and second openings; and
the second opening is covered by the projection of the umbrella-shaped flexible portion when the differential-pressure-producing member is not driven.

13. The fluidic apparatus according to claim 7, wherein the diaphragm is a diaphragm, and irregularities are provided in surfaces of the diaphragm excluding a seal portion and/or inner surfaces defining the first and second valve chambers, respectively, and facing the diaphragm.

14. A fluidic apparatus comprising:
a valve; and
a differential-pressure-producing member; wherein the valve includes:
a valve body defined by a stack including a bottom plate, a plate member including a first valve chamber, a diaphragm, a plate member including a second valve chamber, and a top plate;
a first opening provided in the valve body at a location of the valve body from which fluid flows in and connected to an outlet side of the differential-pressure-producing member;
a second opening provided in the valve body at a location of the valve body from which the fluid flows out; and
a third opening provided in the valve body and into which differentiated fluid flows from a fluid source that is the same as that for the fluid flowing in through the first opening and connected to an inlet side of the differential-pressure-producing member; wherein
at least one of the first opening and the second opening is closed by the diaphragm;
when forces applied by the fluid through the first opening to a front surface of the diaphragm differs from a force applied by the fluid through the third opening to a back surface of the diaphragm, the diaphragm is displaced and allows the first opening and the second opening to communicate with each other; and
the differential-pressure-producing member is defined by a pump.

15. A fluidic apparatus comprising:
a valve; and
a differential-pressure-producing member; wherein the valve includes:
a valve body defined by a stack including a bottom plate, a plate member including a first valve chamber, a diaphragm, a plate member including a second valve chamber, and a top plate;
the diaphragm divides the valve body so as to provide the first valve chamber and the second valve chamber and is displaced under a pressure of fluid;
a first opening provided in the first valve chamber at a location of the valve body from which the fluid flows in and connected to an outlet side of the differential-pressure-producing member, the differential-pressure-producing member producing a pressure difference between the first valve chamber and the second valve chamber;
a second opening provided in the portion of the valve body including the first valve chamber and at a location of the valve body from which the fluid flows out; and
a third opening provided in a portion of the valve body including the second valve chamber and into which differentiated fluid flows from a fluid source that is the same as that for the fluid flowing in through the first opening;
at least one of the first opening and the second opening is closed by the diaphragm;
when a force applied by the fluid through the first opening to a side of the diaphragm facing the first valve chamber and a force applied by the fluid through the third opening to a side of the diaphragm facing the second valve chamber differ from each other, the diaphragm is displaced and allows the first opening and the second opening to communicate with each other; and
the differential-pressure-producing member is defined by a pump.

16. A fluid-supplying apparatus comprising:
a fluid supply source;
a valve; and
a differential-pressure-producing member; wherein the valve includes:
a valve body defined by a stack including a bottom plate, a plate member including a first valve chamber, a diaphragm, a plate member including a second valve chamber, and a top plate;
the diaphragm divides the valve body so as to provide the first valve chamber and the second valve chamber and is displaced under a pressure of fluid;
a first opening provided in a portion of the valve body including the first valve chamber and at a location of the valve body from which the fluid flows in and connected to an outlet side of the differential-pressure-producing member, the differential-pressure-producing member producing a pressure difference between the first valve chamber and the second valve chamber;
a second opening provided in the portion of the valve body including the first valve chamber and connected at a location of the valve body from which the fluid flows out; and
a third opening provided in a portion of the valve body including the second valve chamber and into which differentiated fluid flows from a fluid source that is the same as that for the fluid flowing in through the first opening;
at least one of the first opening and the second opening is closed by the diaphragm; and
when a force applied by the fluid through the first opening to a side of the diaphragm facing the first valve chamber and a force applied by the fluid through the third opening to a side of the diaphragm facing the second valve chamber differ from each other, the diaphragm is displaced and allows the first opening and the second opening to communicate with each other; and the differential-pressure-producing member is a pump.

17. The fluid-supplying apparatus according to claim 16, wherein the fluid supply source is a fuel cartridge; and the fluid-supplying apparatus is included in a fuel cell system.

* * * * *